(12) United States Patent
Huber et al.

(10) Patent No.: US 10,589,714 B2
(45) Date of Patent: Mar. 17, 2020

(54) DETENT STAR WHEEL FOR A STEERING COLUMN OF A MOTOR VEHICLE AND METHOD FOR PRODUCING THE SAME

(71) Applicants: THYSSENKRUPP PRESTA AG, Eschen (LI); thyssenkrupp AG, Essen (DE)

(72) Inventors: Sebastian Huber, Göfis (AT); Jürgen Lampert, Schlins (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/754,246

(22) PCT Filed: Aug. 8, 2016

(86) PCT No.: PCT/EP2016/068853
§ 371 (c)(1),
(2) Date: Feb. 21, 2018

(87) PCT Pub. No.: WO2017/036738
PCT Pub. Date: Mar. 9, 2017

(65) Prior Publication Data
US 2018/0244236 A1  Aug. 30, 2018

(30) Foreign Application Priority Data
Aug. 31, 2015  (DE) ........................ 10 2015 011 134

(51) Int. Cl.
*B60R 25/021* (2013.01)
*F16D 7/02* (2006.01)
*B62D 1/184* (2006.01)

(52) U.S. Cl.
CPC ........ *B60R 25/02105* (2013.01); *B62D 1/184* (2013.01); *F16D 7/021* (2013.01)

(58) Field of Classification Search
CPC ............ B60R 25/02105; B60R 25/021; B60R 25/02126; B60R 25/02153;
(Continued)

(56) References Cited

U.S. PATENT DOCUMENTS 2,006,104 A * 6/1935 Irving Knapper ...... B60R 25/04
 70/185
5,205,790 A * 4/1993 Barnabe ............ B60R 25/02105
 464/162
(Continued)

FOREIGN PATENT DOCUMENTS

CN  2818245 Y  9/2006
CN  201148155 Y  11/2008
(Continued)

OTHER PUBLICATIONS

English Translation of International Search Report issued in PCT/EP2016/068853, dated Dec. 2, 2016 (dated Jan. 4, 2017).

*Primary Examiner* — Lloyd A Gall
(74) *Attorney, Agent, or Firm* — thyssenkrupp North America, Inc.

(57) ABSTRACT

A latching star wheel for a steering lock of a motor vehicle may have a hollow profile with a longitudinal axis and a plurality of latching recesses that can be brought into engagement with a locking bar of the steering lock that can be moved between a locking position and an unlocking position. The latching recesses may be configured as projections. An inner surface of the latching star wheel may be configured as a contact surface that is circularly perforated in a circumferential contour. The latching recesses may extend parallel to the longitudinal axis across a full length of the latching star wheel.

11 Claims, 3 Drawing Sheets

(58) Field of Classification Search
CPC .......... B60R 25/02107; B60R 25/0211; B62D 1/184; F16D 7/021
USPC .......................................... 70/182–186, 252
See application file for complete search history.

(56) References Cited

U.S. PATENT DOCUMENTS

| | | | |
|---|---|---|---|
| 6,755,058 B2 * | 6/2004 | Zillmann .......... | B60R 25/02153 70/186 |
| 7,104,097 B2 * | 9/2006 | Zillmann .......... | B60R 25/02153 70/186 |
| 7,234,328 B2 * | 6/2007 | Okuno ................ | B60R 25/0211 280/775 |
| 7,562,548 B1 * | 7/2009 | Cymbal ............ | B60R 25/02107 70/186 |
| 8,505,346 B2 * | 8/2013 | Sugimoto ......... | B60R 25/02153 70/186 |
| 2004/0020249 A1 * | 2/2004 | Battermann ........... | B21D 39/04 70/186 |
| 2005/0092044 A1 | 5/2005 | Chartrain | |
| 2006/0021398 A1 | 2/2006 | Hasegawa | |
| 2006/0169011 A1 * | 8/2006 | Limburg ........... | B60R 25/02153 70/186 |
| 2006/0272370 A1 * | 12/2006 | Yamada ........... | B60R 25/02107 70/186 |
| 2015/0191195 A1 | 7/2015 | Domig | |

FOREIGN PATENT DOCUMENTS

| | | |
|---|---|---|
| DE | 69000756 T | 4/1993 |
| DE | 10012323 A | 10/2000 |
| DE | 102012101388 A | 8/2013 |
| EP | 0216651 A | 4/1987 |
| EP | 1568554 A | 8/2005 |
| EP | 1728696 A | 12/2006 |
| FR | 2714344 A | 6/1995 |
| FR | 2861673 A | 5/2005 |
| JP | 2010274891 A | 12/2010 |
| JP | 2014156225 A | 8/2014 |
| SU | 485019 A | 9/1975 |
| WO | 2010035127 A | 4/2010 |

\* cited by examiner

DETENT STAR WHEEL FOR A STEERING COLUMN OF A MOTOR VEHICLE AND METHOD FOR PRODUCING THE SAME

CROSS REFERENCE TO RELATED APPLICATIONS

This application is a U.S. National Stage Entry of International Patent Application Serial Number PCT/EP2016/068853, filed Aug. 8, 2016, which claims priority to German Patent Application No. DE 10 2015 011 134.5, filed Aug. 31, 2015, the entire contents of both of which are incorporated herein by reference.

FIELD

The present disclosure generally relates to latching star wheels for steering locks of motor vehicle steering systems.

BACKGROUND

Vehicle steering systems comprise steering locks to safeguard against theft, said steering locks being fitted with a device for disabling a rotational movement of a steering shaft where necessary. Traditionally, a locking member of the steering lock that can be moved into a release or locking position is brought into engagement with a locking sleeve rigidly secured to the steering shaft. For locking, the locking bolt engages with a latching element of a sleeve secured to the steering shaft. In order to release the lock, the locking bolt moves out of the latching element of the sleeve and thereby allows the steering shaft or the steering wheel to move again.

As described in WO 2010/035127 A1, tolerance rings are used in the state of the art in steering columns to connect the steering wheel lock to the steering wheel shaft. In this case, the tolerance ring is held about the shaft circumference by a latching element which is engaged with the steering wheel lock in the locked state. When the steering wheel lock is in the unlocked state, the tolerance ring is rotated with the latching element in an unimpeded manner, so that the driver is able to steer the car. At the same time, the tolerance rings are configured in such a manner that they prevent the steering wheel lock from being prized open. Via tolerance rings, high torques act on the shaft and the latching element. Above a threshold value, the shaft and the latching element can slip relative to one another. If the steering column is located in the locked state during unauthorized use of the vehicle, the motor vehicle cannot be properly steered. At the same time, damage to the steering column is prevented. The disadvantages of using a tolerance ring of this kind are that considerable effort is required in order to achieve a defined threshold value of the torque between the shaft and the latching element. In this case, it may be necessary for two tolerance rings to be used or grooves worked into the shaft.

DE 100 12 323 A1 discloses a locking sleeve for a steering column which is formed by a profiled pipe section which is provided with grooves. The grooves have projecting and recessed regions on the outside of the pipe section which interact with a bolt of a locking mechanism and the tires have contact surfaces with the steering column on the inside. The locking sleeve is pushed onto the steering column by force. The disadvantage of this solution is that the form of the locking sleeve is not sufficiently flexible to allow a latching element to be pushed onto the steering column with force and, at the same time, to absorb manufacturing tolerances to an adequate degree. Moreover, the geometry of the locking sleeve means that it is not possible for a precise defined and reproducible threshold value of the torque to be achieved between the shaft and the latching element.

EP 1 568 554 A1 discloses a method for producing a locking sleeve which is formed by deformation into a tubular sleeve body with a hollow profile in cross section with a joint. At each joint, a closed hollow body is formed with a connection element. The forming of the projections may take place through a forming action without machining, such as deep-drawing, for example. The rolling-in of the sleeve body may take place over multiple forming or bending steps. The disadvantage of this production method is that cracks can occur with high natural strains, particularly in the bending radii.

Thus a need exists for a latching star wheel for a steering lock of a motor vehicle that has good torsional properties and thereby provides a reproducibly defined threshold value for the torque between the shaft and latching element and, in addition, can be produced in the simplest and most cost-effective way possible.

DETAILED DESCRIPTION

Figure 1:
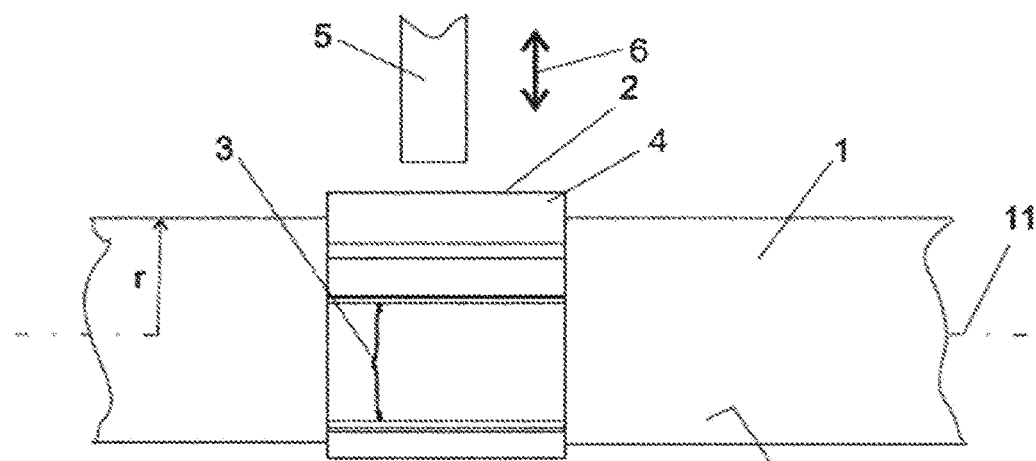
FIG. 1 is a schematic view of an example steering shaft with a latching star wheel and a locking mechanism.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to this, a latching star wheel is provided for a steering lock of a motor vehicle, having a hollow profile with a longitudinal axis and a plurality of latching recesses arranged on the outer circumference which can be brought into engagement with a locking bolt of the steering lock that can be moved into the locking or unlocking position, wherein the latching recesses are formed by projections and an inner surface of the latching star wheel forms a circular contact surface that is perforated in the circumferential contour, wherein the latching recesses extend consistently in parallel to the longitudinal axis across the entire length of the latching star wheel. This hollow profile is particularly easy to produce and is so flexible that the latching star wheel can be moved onto the steering shaft without damaging it. Due to the circumferential contour which is substantially circular in cross section and forms a group of partial surfaces of a cylinder casing of a circular cylinder overall on the inside of the latching star wheel, said latching star wheel lies against the steering shaft in a defined manner.

The latching recesses are preferably arranged in a uniformly distributed manner over the circumference.

It is provided that the latching star wheel has at least four latching recesses. Eight latching recesses are particularly preferred in this case.

The projections preferably form pockets on the inside.

In a preferred embodiment, the projections take up between two-fifths and three-quarters of the circumference of the circular envelopes of the latching star wheel, in particular between two-fifths and half of the circumference of the circular envelope.

The projections are particularly preferably U-shaped and have a height projecting beyond the circular envelope which corresponds, in particular, to one-and-a-half times the material thickness of the latching star wheel between the single and the triple material thickness of the latching star wheel.

All projections are preferably identically formed.

Furthermore, a steering lock with a previously described latching star wheel is provided.

In addition, a preferred method for producing a previously described latching star wheel for steering locks is provided which comprises the following steps: bend-forming or rolling of a metal sheet to form the projections and latching recesses; bend-forming the profiled metal steel into a body which is hollow-profiled in cross section; joining the profiled metal sheet to a closed hollow profile, for example by welding.

A further method involves introducing metallic material into a cavity and forming the latching star wheel through extrusion molding of the material through a die plate.

Alternatively, the latching star wheel may also be represented as a section of a drawn profile.

The latching star wheel with its projections may, in addition, preferably be formed by impact extrusion.

Figure 2:
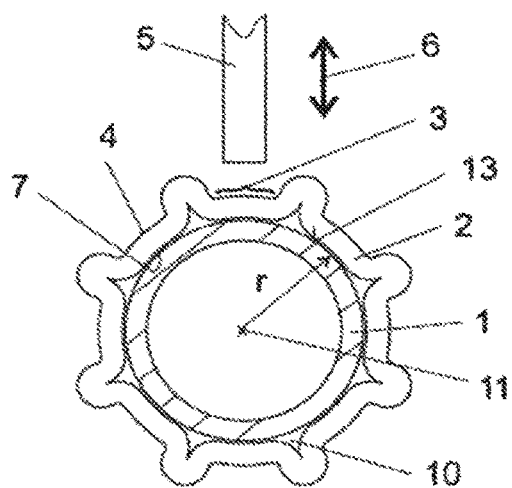
FIG. 2 is a schematic cross-sectional view of an example steering shaft with a latching star wheel viewed through a steering shaft.

FIGS. 1 and 2 show schematically a steering shaft 1 with a latching star wheel 2 arranged directly thereon, which for the one part prevents the rotational movement of the steering column in the locked state and at the same time provides a high torque, in order to prevent the steering lock from being prized open in the event of theft. At the same time, the latching star wheel 2 is designed in such a manner that when a predefined torque, for example more than 200 Nm, is exceeded, the latching star wheel 2 slips through on the steering shaft 1, so that the steering shaft 1 is not destroyed. The latching star wheel 2 comprises multiple latching recesses 3 on the outside 4 thereof. The locking bolt 5 is a constituent part of a steering lock and is adjustably mounted in the steering lock in accordance with the double arrow 6 shown. The locking bolt 5 in this case is moved, depending on whether the steering lock is in a locking or unlocking position, into one of the latching recesses 3 of the latching star wheel 2 or away therefrom.

The latching star wheel 2 is pushed by force onto the steering shaft 1 to form a friction connection, wherein the steering shaft 1 is preferably configured in a precisely circular-cylindrical manner and has an outer outside radius r. The steering shaft may, however, also be formed only sectionally in a circular-cylindrical manner, wherein it has an enveloping circle with an outside radius r.

Figure 3:
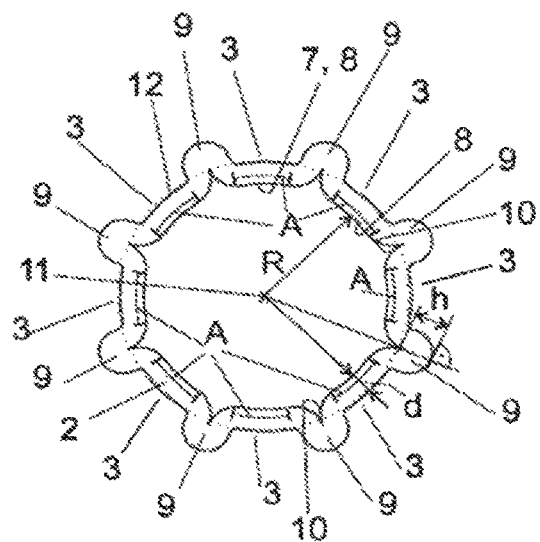
FIG. 3 is a cross-sectional view of an example latching star wheel.
Figure 4:
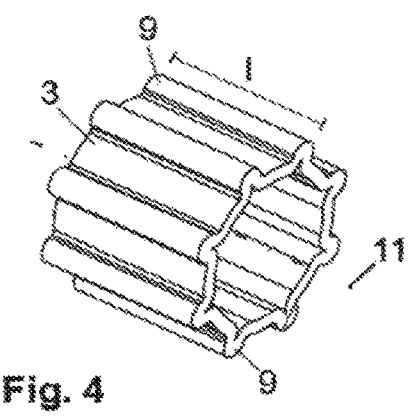
FIG. 4 is a spatial view of the example latching star wheel of FIG. 3.
Figure 5:
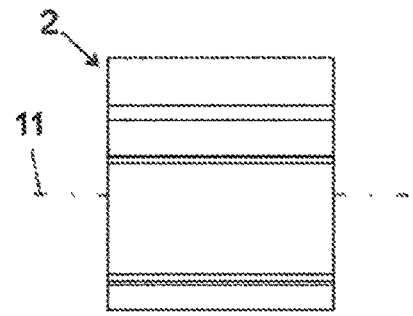
FIG. 5 is a side view of the example latching star wheel of FIG. 3.

FIGS. 3 to 5 show a first embodiment of the latching star wheel 2. The latching star wheel 2 has a hollow profile that is identical over the entire latching star wheel length 1. The inner surface 7 forms a circular contact surface 8 which is perforated in the circumferential contour and which lies in abutment with the steering shaft 1 in the assembled state. The adjacent contact surface portions each have a arc length A, along which the inner surface 7 of the latching star wheel 2 forms a circular contact surface 8 with an inside radius R. The total of the individual arc lengths A at which the inner surface 7 of the latching star wheel 2 is in direct pressing contact with the outer surface 13 of the steering shaft is preferably at least 30% of the arc length of the outer circumference (=circumferential arc length) of the steering shafts 1. More preferably, the total of the individual arc lengths A is greater than 40% or equal to 40% of the circumference arc length of the steering shaft 1. It is furthermore preferable for the total of the individual arc lengths A to be greater than or equal to 50% of the circumferential arc length of the steering shaft 1. In all cases it is preferable here for the total of the arc lengths A to constitute less than 80% of the circumference arc length of the steering shaft 1. This also applies in particular to the exemplary embodiments depicted below.

On the outside 4 the latching star wheel 2 has identically formed projections 9 distributed at regular intervals over the circumference, said projections forming counter-formed pockets 10 on the inside. The projections 9 are substantially U-shaped in design and are arranged parallel to a longitudinal axis 11 of the latching star wheel 2. They are substantially web-shaped in design. The projections 9 take up roughly two-fifths of the circumference of a circular envelope 12. The projections 9 in this case have a height h by which they project beyond the envelope 12 which roughly corresponds to the material thickness d of the latching star wheel 2. The height h and the material thickness d in this case are measured parallel to the line to the longitudinal axis 11, as is represented in FIG. 3. A total of eight projections 9 are provided. A latching recess 3 lying on the outside 4 is formed by two adjacent projections 9. The pockets 10 in this case are particularly narrow in form in the circumferential direction, so that the contact surface 8 of the latching star wheel 2 on the steering shaft 1 can preferably be as large as possible. In this way, a high transmitting torque can be achieved. If the threshold of the maximum transmittable torque is exceeded, despite the large-area contact surface 8 of the latching star wheel 2 on the steering shaft 1, a rotation of the latching star wheel 2 relative to the latching shaft 1 is guaranteed. Because the corrugated profile is the same over the entire latching star wheel length l, the latching star wheel 2 has a high degree of elasticity. This is necessary in order to move the latching star wheel 2 onto the steering shaft 1 without damage and with a secure press fit. Prior to assembly, the outside radius r of the steering shaft and the inside radius R of the latching star wheel is preferably formed with an overlap to form the press fit. The overlaps in this case are preferably at least 0.02 mm. Particularly preferable are overlaps of at least 0.05 mm. Overlaps of more than 2 mm should preferably be avoided, however. Overlaps in the region of 0.1 mm to 1.0 mm are preferable, in order to form a desired torque resistance of the press connection. Particularly preferable are overlaps in the region of 0.2 to 0.8 mm, in order to form a desired torque resistance of the press connection. These overlaps can also be used, in particular, for the exemplary embodiments listed below.

Figure 6:
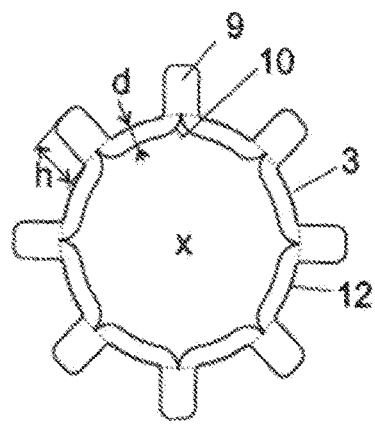
FIG. 6 is a cross-sectional view of another example latching star wheel.

FIGS. 4 to 8 show further preferred embodiments of the latching star wheel 2 with eight projections 9 uniformly distributed over the circumference. The embodiment in FIG. 6 shows projections 9 which likewise take up roughly two-fifths of the circumference of the circular envelope 12. The projections 9 in this case have a height h which roughly corresponds to three times the material thickness d of the latching star wheel 2.

Figure 7:
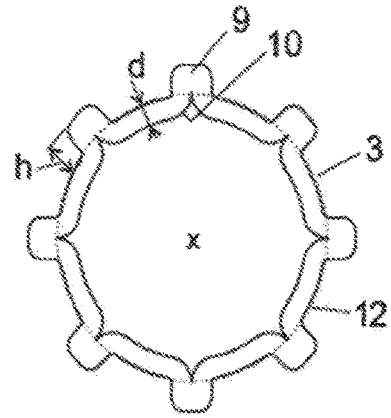
FIG. 7 is a cross-sectional view of still another example latching star wheel.

The elongation of the latching star wheel 2 is particularly large in accordance with the embodiment in FIG. 7. The projections 9 in this case have a height h which roughly corresponds to one-and-a-half times the material thickness d of the latching star wheel 2. Unlike in the case of the preceding exemplary embodiments, the projections 9 form only roughly one-third of the circumference of the circular envelope 12.

Figure 8:
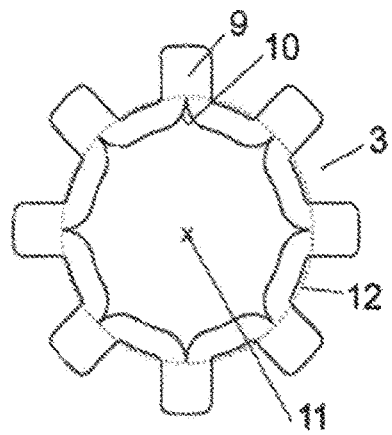
FIG. 8 is a cross-sectional view of yet another example latching star wheel.

The embodiment in FIG. 8 shows projections 9 which take up half the circumference of the circular envelope 12 and project by roughly double the material thickness d of the latching star wheel beyond the envelope 12.

Figure 9:
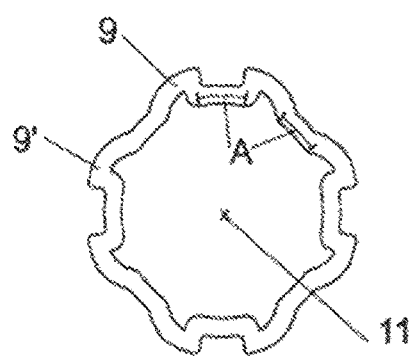
FIG. 9 is a cross-sectional view of another example latching star wheel.
Figure 10:
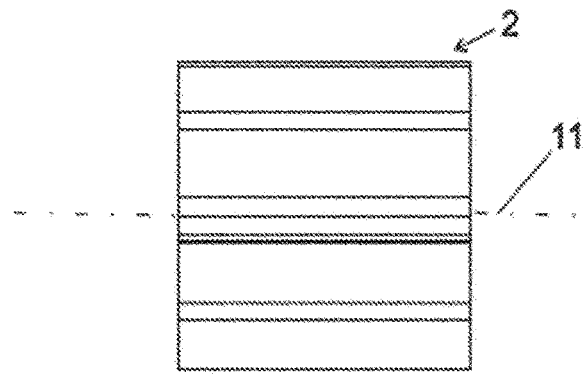
FIG. 10 is a side view of the example latching star wheel of FIG. 9.
Figure 11:
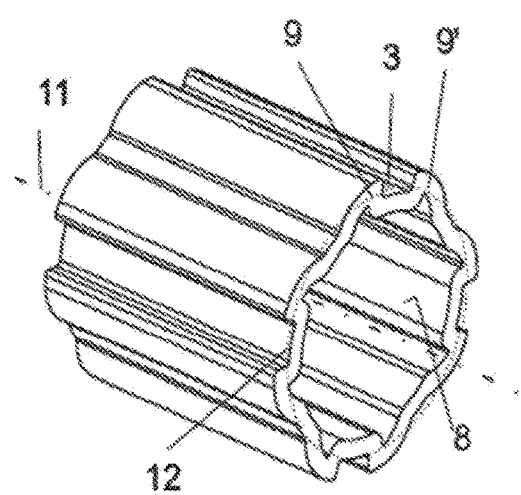
FIG. 11 is a spatial view of the example latching star wheel of FIG. 9.

The exemplary embodiment in FIGS. 9 to 11 exhibits projections 9, 9' which are each configured in pairs. The projections 9, 9' are formed with a serrated shape and are each oriented in the circumferential direction to one another in a mirror-inverted manner. Between the projections 9, 9' arranged in pairs, the latching recesses 3 in each case are provided in such a manner that a total of four latching recesses 3 are provided. This embodiment is particularly well suited to representation using an extrusion process.

Figure 12:
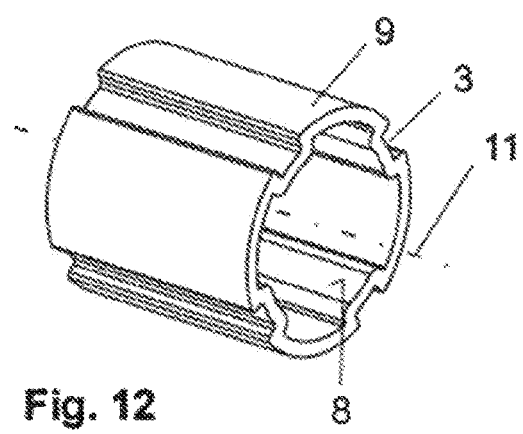
FIG. 12 is a spatial view of an example latching star wheel.
Figure 13:
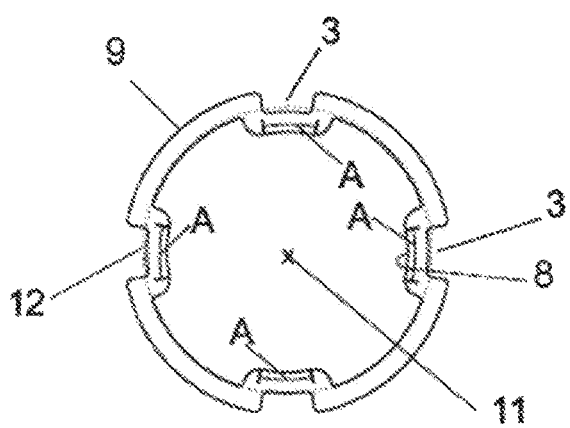
FIG. 13 is a cross-sectional view of the example latching star wheel of FIG. 12.

FIGS. 12 and 13 show a further embodiment in which four U-shaped latching recesses 3 uniformly distributed over the circumference are arranged on the outside, which latching recesses are formed by four projections 9. The projections 9 take up roughly three-quarters of the circumference of the circular envelope 12. The projections 9 or latching recesses 3 are formed in such a manner that they create an interrupted circular bearing 8 on the inside on the steering shaft 1. This embodiment is particularly well suited to representation in an extrusion process.

The latching star wheel is preferably made of a readily formable steel or also of spring steel.

The latching star wheel may be produced by bend-forming, in particular by roll-forming. In this case, a metal sheet is preferably bent in pieces until the finished profile finally emerges with the desired number of projections or latching recesses. The metal sheet is preferably welded after it has been bent round into a profiled hollow pipe.

In a further preferred embodiment of the invention, the latching star wheel is introduced into a die plate and formed by means of extruders or holes. An impact extrusion method for production of the latching star wheel is also possible.

The latching star wheel according to the invention for a steering lock of a motor vehicle has particularly good torsional properties on account of its continuous corrugated hollow profile. A tolerance ring for balancing tolerances and for representing a torque is therefore indispensable. By choosing the contact surface between the latching star wheel and the steering shaft, a defined threshold value of the torque is set between the steering shaft and latching element. Because the hollow profile is uniform over the length of the latching star wheel, said latching star wheel can be produced particularly easily and cost-effectively.

What is claimed is:

1. A latching star wheel for a steering lock of a motor vehicle, comprising:
   a hollow profile with a longitudinal axis,
   a plurality of projections formed about the hollow profile,
   latching recesses formed between adjacent pairs of the plurality of projections and disposed coincident with a circular envelope with a center, the latching recesses extending parallel to the longitudinal axis across a full length of the latching star wheel and configured to engage with a locking bar of the steering lock that is movable between a locking position and an unlocking position, and
   a plurality of contact surfaces formed on an inner surface of the latching star wheel forming an interrupted surface, each respective one of the plurality of contact surfaces corresponding in circumferential position to a respective one of the latching recesses, each of the plurality of contact surfaces having an arc parallel to the circular envelope.

2. The latching star wheel of claim 1 wherein the latching recesses are uniformly distributed over a circumference of the latching star wheel.

3. The latching star wheel of claim 1 comprising at least four of the latching recesses.

4. The latching star wheel of claim 1 comprising at least eight of the latching recesses.

5. The latching star wheel of claim 1 wherein the projections define pockets therebetween on an inside of the latching star wheel.

6. The latching star wheel of claim 1 wherein the projections occupy between two-fifths and three-quarters of a circumference of the circular envelope that coincides with recessed surfaces of the latching recesses on an outside of the latching star wheel.

7. The latching star wheel of claim 1 wherein the projections occupy between two-fifths and one-half of a circumference of the circular envelope that coincides with recessed surfaces of the latching recesses on an outside of the latching star wheel.

8. The latching star wheel of claim 1 wherein the projections are U-shaped and have a height that projects beyond the circular envelope by an amount that corresponds to between one and three times a material thickness of the latching star wheel, wherein the circular envelope coincides with recessed surfaces of the latching recesses on an outside of the latching star wheel.

9. The latching star wheel of claim 1 wherein the projections are U-shaped and have a height that projects beyond the circular envelope by an amount that corresponds to approximately 1.5 times a material thickness of the latching star wheel, wherein the circular envelope coincides with recessed surfaces of the latching recesses on an outside of the latching star wheel.

10. The latching star wheel of claim 1 wherein the projections are U-shaped and have a height that projects beyond the circular envelope by an amount that corresponds to between 1.25 and 1.75 times a material thickness of the latching star wheel, wherein the circular envelope coincides with recessed surfaces of the latching recesses on an outside of the latching star wheel.

11. The latching star wheel of claim 1 wherein the projections are identical.

\* \* \* \* \*